United States Patent [19]

Porter et al.

[11] 4,125,108
[45] Nov. 14, 1978

[54] PANELS FOR SOLAR HEATING SYSTEM

[76] Inventors: Clifford Porter, 13 Pt. Eleanora's La., Crestwood, N.Y. 10707; Paul Bakun, 14 Terrace Ct., Old Westbury, N.Y. 11568

[21] Appl. No.: 805,656

[22] Filed: Jun. 13, 1977

Related U.S. Application Data

[63] Continuation-in-part of Ser. No. 597,541, Jul. 21, 1975, Pat. No. 4,037,583.

[51] Int. Cl.² .............................................. F24J 3/02
[52] U.S. Cl. .................................. 126/271; 428/649; 29/157 R
[58] Field of Search ............... 126/270, 271; 237/1 A; 165/DIG. 6; 220/64; 29/157 R; 60/641; 428/649; 427/331

[56] References Cited

U.S. PATENT DOCUMENTS

| 3,176,679 | 4/1965 | Langley | 165/DIG. 6 |
| 3,788,513 | 1/1974 | Racz | 126/390 |
| 3,968,786 | 7/1976 | Spielberg | 126/270 |
| 3,976,508 | 8/1976 | Mlavsky | 126/270 |
| 3,990,431 | 11/1976 | Mazzoni et al. | 126/271 |
| 4,018,211 | 4/1977 | Barr | 126/271 |

Primary Examiner—Kenneth W. Sprague
Attorney, Agent, or Firm—Posnack, Roberts, Cohen & Spiecens

[57] ABSTRACT

For use in a solar heating system in which is employed a source of a heatable fluid, a solar heating panel made of spaced corrugated metal sheets which form an envelope which is fed by tubes attached to the top and which is drained by tubes at the base. The envelope may alternatively be made up of flattened tubes which would compartmentalize the envelope. The envelope is coated with Teflon to improve heat retention and reduce heat loss.

20 Claims, 9 Drawing Figures

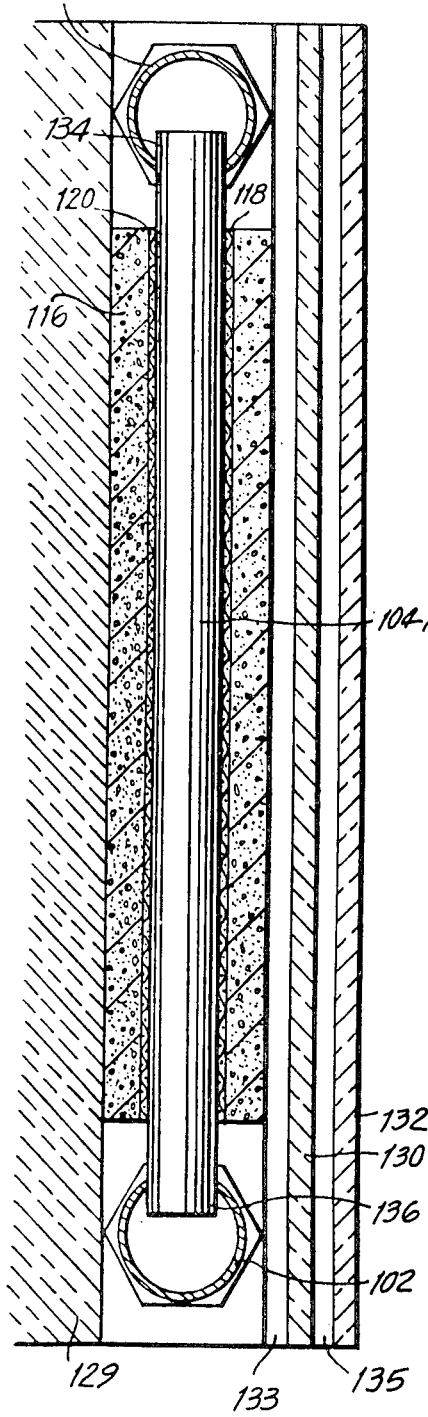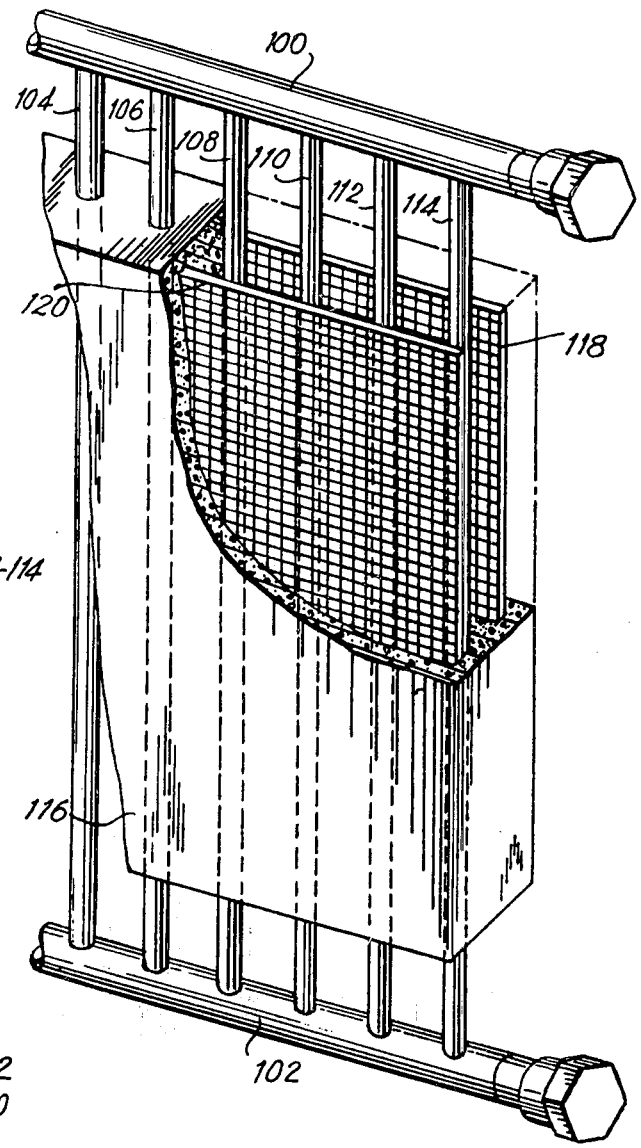

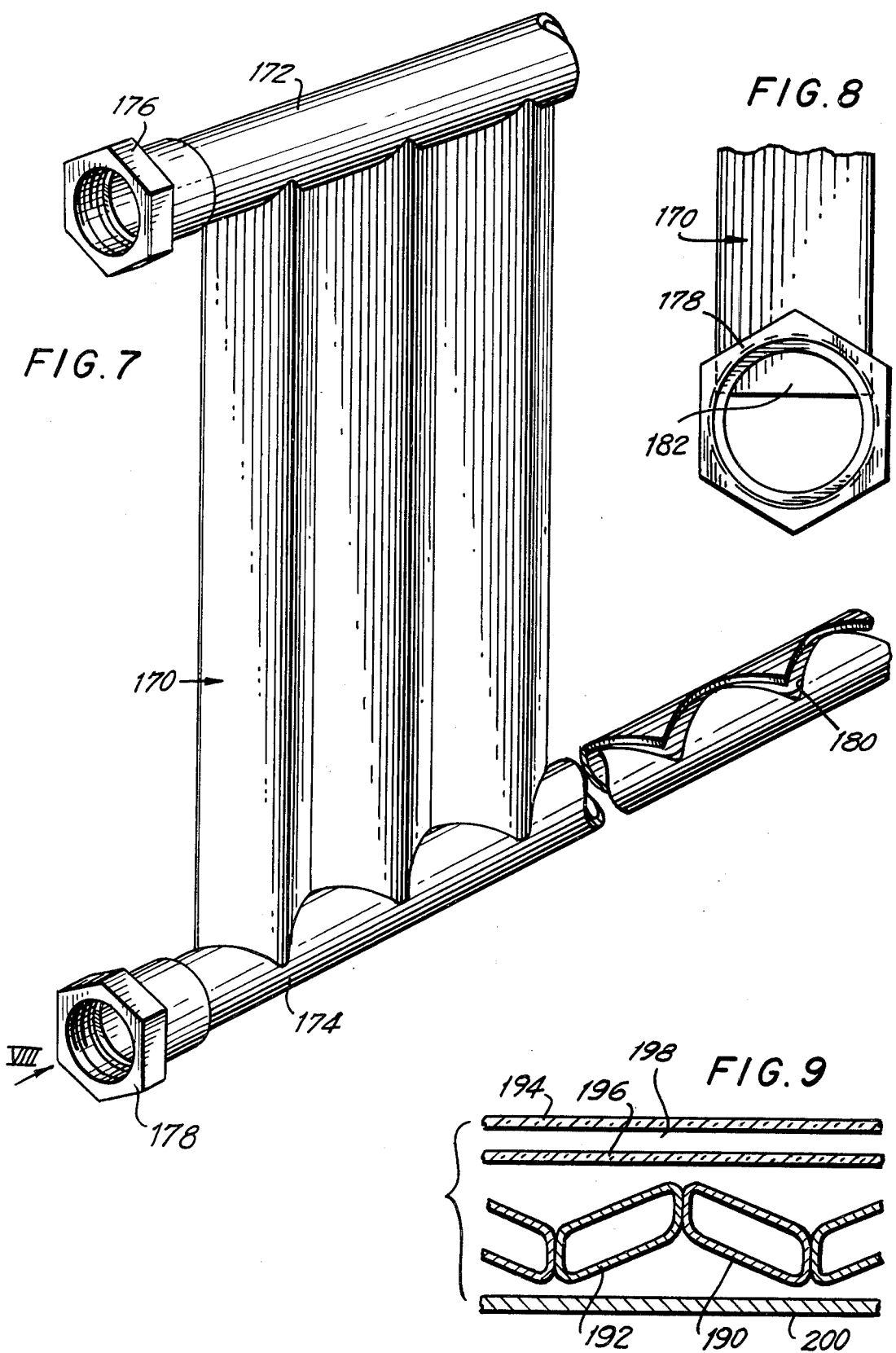

PANELS FOR SOLAR HEATING SYSTEM

OTHER APPLICATIONS

This is a continuation-in-part of our earlier filed application Ser. No. 597,541, filed July 21, 1975, now U.S. Pat. No. 4,037,583.

FIELD OF INVENTION

This invention relates to solar heating panels for use in solar heating systems.

BACKGROUND

The basic patent relied upon in the examination of our earlier application Ser. No. 597,541 was the Thomason U.S. Pat. No. 3,812,903. A relationship between this patent and the general subject matter of the instant application is acknowledged. Nevertheless, this patent fails to show many of the features to which the present application is directed. Thus, for example, this patent does not disclose a corrugated envelope through which heatable fluid passes when travelling between input tubes and output tubes. The patent, moreover, fails to disclose any of the features relating thereto such as, for example, a plastic coating on such corrugated envelope.

A second patent cited against our earlier application is the Gaydos U.S. Pat. No. 3,815,574. This patent also fails to disclose a corrugated envelope and other related features. Even if this patent were to be considered applicable in a structural sense, it deals with sand which is different from concrete. Sand is loose and not capable of providing sufficient contact between particles as to result in the transfer of heat provided by concrete. The utilization of sand in which to pack tubing is in no sense a disclosure of concrete and particularly so when one considers that the Applicants' use of concrete in the present application is in combination with heat transferring mesh cooperating with tubes to which heat is transferred both directly and indirectly. As a consequence, the Gaydos patent is in no sense anticipatory.

The U.S. Pat. No. 3,889,742 has also been previously cited. In column 6 of this patent, it is stated that a sandwich may be made of corrugated aluminum plate and flat aluminum plate together defining a plurality of passages through which heat transfer fluid is circulated. This patent was relied on to show the use of a coating; however, the patent merely sets forth that the exposed face of a plate may be coated with a selective coating which reduces infrared emission from the collector surface. No mention is made of utilizing a coating directly on a corrugated envelope of a form as in the present application and it is quite difficult to envisage specifically what is meant by the exposed face of a plate in the Rush patent. In fact, one side of the passages identified by Rush appears to rest upon an insulated base which is wholly unlike the structure envisaged in the present application.

T. B. Modine in U.S. Pat. No. 2,274,492 reveals a heating device with a substantially flat heat transfer element comprising a pair of substantially parallel inlet and outlet pipes and a plurality of smaller cross-tubes connecting these pipes for the passage of fluid to be heated from the inlet pipe to the outlet pipe. In this arrangement a plurality of fins extend between and are rigidly secured to the cross-tubes. These fins are substantially parallel with the common axial plane of the pipes. A container is provided which encloses the aforesaid element consisting of a bottom, a glass top and side and end members. A layer of heat insulating material is positioned between the heat transfer element and the above-noted bottom.

O. H. Mohr in U.S. Pat. No. 2,122,821 has as an object the improving and simplifying of the construction and operation of solar heaters. A heater is provided which consists of a series of spaced upwardly inclined tubes connected at their upper and lower ends by headers, the tubes and headers being made of a metal such as copper or the like having a high coefficient of heat conductivity and being painted or colored black to absorb the greatest amount of heat possible when exposed to radiation. Mohr provides a housing or box for the receiving and support of the heating tubes and headers, the box being insulated to retain heat and being covered with two or more layers of glass with an intermediate dead air space to reduce conduction losses to a minimum. There is further provided an arrangement of tubes and headers which not only function as a solar heater but also as a hot-water storage reservoir. An auxiliary heater is employed for heating and circulating water in the solar heater when necessary. A winding is provided within the housing whereby both direct and reflected radiant energy is utilized in between the tubes and headers.

According to U.S. Pat. No. 2,208,789, B. H. Cally provides for a construction of a solar heating unit in such a manner that smaller heating tubes are used than were previously employed and novelty is provided in joining the tubes with header pipes of a larger diameter in such a manner that the speed of circulation may be any predetermined speed deemed necessary for proper heating of the water.

According to U.S. Pat. No. 3,514,942, W. F. Kyryluk provides a solar heater transducer including a transducer element having an outer member of a material transparent to solar radiation energy rays in combination with an enclosure with a space defined in between an inner side of the transducer and a wall of the enclosure, with a fluid heated by the transducer positioned in the enclosure.

G. Meckler in U.S. Pat. No. 3,369,540 bases his invention upon the discovery of apparatus for preventing or minimizing the thermal load normally imposed on the air conditioning system of a building due to external natural light sources. In accordance with his invention, Meckler provides a multisheet light transmitting structure which is capable of absorbing a substantial amount of solar energy which it would otherwise pass therethrough and which is capable of dissipating this energy while minimizing the increased heat load in the building.

F. M. Kiser in U.S. Pat. No. 2,167,576 provides a cover or hood formed of a material adapted to concentrate the sun's rays upon a water heating tank. The size and shape of the hood is determined by the hot water requirements and the hood preferably comprises upwardly inclined glass side walls, glass end walls and a glass top wall, the walls being connected together and reinforced.

The Johnston U.S. Pat. No. 2,998,006 disclosed a solar heater in which the front wall has a coating of heat absorbic substance thereon, such as for example, black paint. A fibrous mat is provided on the outside of the coating and is adhered thereto by applying the mat directly onto the paint. The insulating mat is made of a highly transparent, non-reflective substance such as an expanded and impregnated glass fiber of minimum density. This allegedly permits the sun's rays to pass therethrough in order to reach the black coating at which the heat from the sun's rays is surrendered to the metal wall without reflection. The mat holds the heat there until the highly conductive metal wall can have the heat conducted therefrom by a fluid in the compartment associated with the metal wall. Insulation is employed which helps to hold the heat in the compartment whereby the fluid in the compartment can be drawn therefrom or can be continuously circulated therethrough and used for any purpose.

While the above patents refer generally to solar heating and solar heating systems and panels and while these patents furthermore may use some individual features which we also employ in the present invention, they do not, it is believed, achieve the effectiveness of solar heat recovery which is achieved in accordance with the instant invention and consequently are not anticipatory thereof.

SUMMARY OF INVENTION

It is an object of the invention to provide improved solar heating panels for solar heating systems.

It is a further object of the invention to improve solar panel effectiveness for the recovery of solar heat.

It is another object of the invention to provide an improved solar heating panel in which heat is retained and the loss of heat due to wind and the like is reduced.

In achieving the above and other objects of the invention there is provided a solar heating panel comprising a hollow envelope having a plurality of ridges and valleys, said envelope being of heat conductive metal, a primer coating of heat absorbent material on said envelope, and at least one coating of clear plastic on said primer coating.

A means is provided to pass a heat absorbing liquid in a determinable path through the envelope, the ridges and valleys being aligned in parallel with each other and with said path.

The aforesaid plastic is preferably Teflon which is provided in at least one layer of an order of magnitude of thickness of about 0.0005–0.0015 inches. Up to three additional layers of Teflon may be provided on the first said layer. The Teflon is preferably provided with a semi-gloss finish.

The envelope may be so formed as to have a single interior chamber for the passage of heat conductive fluid or may be provided in the form of a plurality of parallel cells. A box-like structure may be provided housing the envelope and including at least one radiation permeable pane which shields said envelope. A plurality of radiation permeable panes may be employed with the panes being spaced from each other and from the envelope.

The primer coating is preferably a deoxidant and the envelope preferably has two parallel faces of corresponding corrugated form.

The invention also contemplates the provision of a method of making a solar panel which comprises forming an envelope with two metal corrugated faces, coating at least one of said faces with a light absorbing deoxidant, spraying plastic on the thusly coated faces, and baking the plastic. The plastic is preferably coated on to a thickness to about 0.0005–0.0015 inches and is baked on at about 700° F. The plastic may be coated on in up to four layers, each of which is separately baked on and is of a thickness of about 0.0005–0.0015 inches.

The above and further objects, features and advantages of the invention will be found in the detailed description which follows hereinafter.

BRIEF DESCRIPTION OF DRAWING

In the drawing:

FIG. 2 is a sectional perspective view illustrating a solar panel in accordance with an embodiment of the invention;

FIG. 3 is a sectional view through the solar panel of FIG. 2;

FIG. 7 is a perspective view of a further embodiment of the invention;

FIG. 8 is a view of the bottom tube fitting viewed in the direction of arrow VIII; and FIG. 9 is a cross-sectional view illustrative of a further embodiment of the invention.

DETAILED DESCRIPTION

Figure 1:
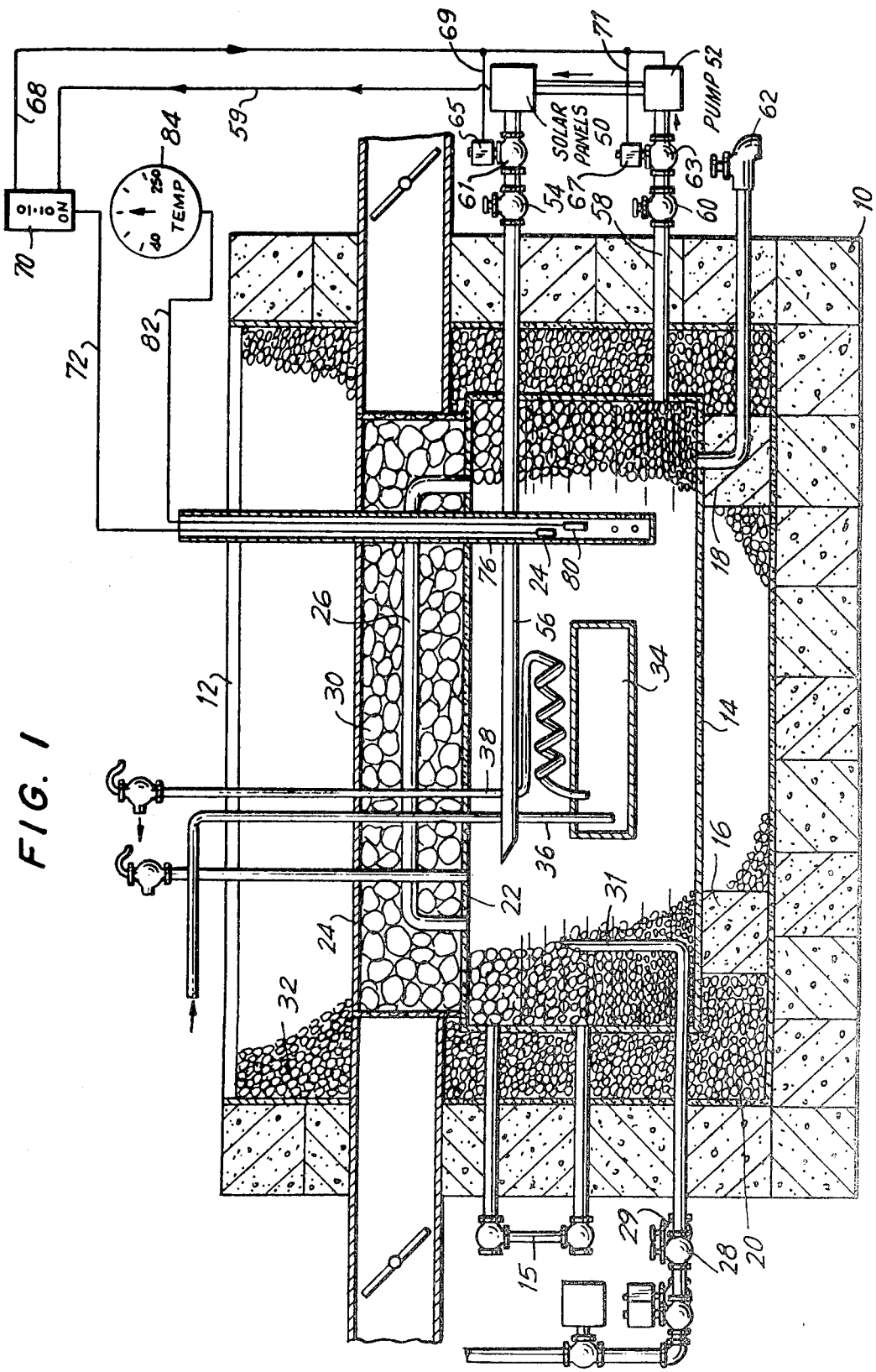
FIG. 1 is a partly sectional view through a solar heat recovery and storage system provided in accordance with the invention.

In FIG. 1 is illustrated a concrete or cinder block bin 10 optionally provided with a cover 12 thereupon. Within the bin 10 is located the solar storage tank 14 which is provided with a glass sight 15 and is supported on a plurality of blocks such as indicated at 16 and 18. Th storage tank 14 may be of metal and may be externally coated with tar or the like. It is surrounded by a volume of aggregate such as indicated at 20. This aggregate may be a commercially available, light aggregate which is kiln-heated expanded shale provided with dead air cells, the shale having an external dimension of about ¾ to 1¼ inches.

Within the storage tank 14, the aggregate increases in size from the bottom to the top of the tank. The aggregate in this case is about 1½ to 3 inches and preferably consists of oversized gravel. This gravel or aggregate has a substantially greater heat retention that water.

Located above the tank 14 and more particularly on top portion 22 of said tank is a duct 24. This duct may be connected with the trunk or branch ducts of a hot air heating system. The tank 14 communicates upwardly into the duct 24 by means of tubes 26 which are shown by way of illustration only. A number of tubes arranged in parallel may be employed. The tubes may be omitted if desired, the communication between the tank and duct 24 then taking place simply through openings provided for this purpose.

Within the duct 24 is located a volume of rocks 30. These rocks are preferably larger than the aggregate within the tank 14. The purpose of the rocks 30 is to retain the heat released from the tank 14 via tubes 26 and to heat air passing through the duct 24 which is then employed as a heating medium in a hot air heating system.

In addition to the hot air duct placed at the top of the solar tank, a fluid circulating system is connected to the existing hot water system. A discharge line 28 at the base of the tank is connected to a riser 31 within the solar tank. This will draw the warm water from the upper part of the tank. The water is returned through a line 29 (generally obscured behind line 28) attached to the base of the tank where the water is cooler.

In addition to the aggregate and rocks employed in the aforesaid arrangement, the duct 24 is moreover surrounded by a volume of further aggregate indicated at 32 and serving to provide essentially dead air spaces around the duct 24 to prevent an undesirable cooling of the latter.

There is also provision for a hot water source in the form of a hot water supply tank 34 which provides hot water via a tube 38 and which receives water via tube 36. The purpose of tank 34 is to heat fluid (e.g. water) with heat which is stored within the tank 14 and which is heated by solar panels as will be indicated hereinafter. This heated fluid can further be supplemented by a conventional hot water source (not shown).

The solar heating panels employed in the system illustrated in FIG. 1 are generally indicated at 50. Also indicated in association with the solar panels is a pump 52. The pump 52 is a source of heatable fluid which is driven through the solar heating panels at a controlled rate. The heating fluid proceeds from the solar panels via a manually and/or electrically controlled valve 54 and via tube 56 into the tank 14. Water or other suitable heatable fluid is returned to the pump 52 via a tube 58 and a manually controlled valve 60 constituting with the pump and solar panels as well as the tank 14 a closed loop. Provision is made for draining the tank 14 such as for purposes of flushing via a manually controlled tap 62.

It will be noted that the pump 52 has connected thereto an electrical control line 68. The line 68 is connected to a thermostat 70 which is in turn connected via capillary line 72 to a pickup device 24. The pickup device 24 is located within a tube 76 extending downwardly into the tank 14 and provided with perforations at the lower end thereof whereby to admit heated fluid while keeping out the surrounding aggregate. Also located in the tube 76 is a temperature pickup device 80 connected via a capilliary line 82 to an external thermometer indicated at 84.

In the aforesaid arrangement, the thermostat 70 may be functionally connected in series via line 59 with a second thermostat (not shown) in solar panels 50. The operation of two such thermostats in conjunction with one another will prevent the passing of fluid from the solar panels to the tank 14 and vice-versa under undesirable circumstances such as when fluid in the solar panels 50 will be too cool to admit into the tank 14 since this would only result in a cooling of the tank 14 or when the temperature of the fluid within the tank 14 is in excess of that in the solar panels 50 whch would result in an undesirable transfer of heat from the tank 14 to the solar panels 50.

Also shown in FIG. 1 are valves 61 and 63 having solenoid controls 65 and 67 connected via lines 69 and 71 to control lines 68. This provides for automatic control of circulation by operation of thermostat 70.

FIG. 2 illustrates one form of solar panel, the use of which is contemplated in accordance with the invention. Herein appear a header tube 100 and a return tube 102 between which extend a plurality of copper tubes such as indicated at 104, 106, 108, 110, 112 and 114. The tubes 104–114 are illustrative of a plurality of coplanar tubes connecting the header and return tubes 100 and 102 for purposes of the circulation of a heatable fluid through a heatable mass such as indicated in the form of a concrete block 116.

The tubes 104–114 are embedded in the concrete block 116, but therein are sandwiched between two sheets of copper screening indicated at 118 and 120. The use of the parallel sheets 118 and 120 of copper screening renders substantially more effective the transfer of heat to the heatable fluid passing through the aforesaid network of riser tubes.

FIG. 3 illustrates the aforesaid arrangement of tubes and concrete. In FIG. 3 can be seen the concrete mass 116 in which are embedded the sheets of copper screening 118 and 120 with the various tubes 104–114 passing therebetween and extending upwardly into the header tube 100 and downwardly into the return tube 102. Insulation 129 is located on the left side of block 116. Also seen in FIG. 3 are the glass or plastic shields 130 and 132 which are spaced from each other in a manner which will be described more fully hereinbelow. They are also spaced from block 116 as indicated at 133.

The shields which are made of either glass or plastic are generally mounted above the panel (i.e., to the right in FIG. 3) and cover the enclosure (not shown) which houses the panel. The space 135 between the double glass or plastic is a dead air space which acts an as insulator. The space between the glass shields and panel is a heat trap to help retain the heat absorbed by the panel. The insulation 129 in the enclosure is placed directly behind (i.e., to the left in FIG. 3) the concrete absorber panel.

in FIG. 3, it is seen that the riser tubes extend upwardly into the header tube 100 such as indicated at 134 and downwardly into return tube 102 such as indicated at 136. The purpose of extending the riser tubes into the header and return tubes is that this inward extension into the header and return tubes constitutes a solids trap whereby accumulations of solids in the heatable fluid are prevented from flowing through the riser tubes.

The dark concrete employed in accordance with the invention is preferably a black concrete mix formed by the addition of carbon black or iron oxide. The black concrete mix heats at a slower rate than metal and is primed by the early morning sun in normal use. As the position of the sun peaks, the panel heats, more rapidly transferring its heat to the highly conductive copper screening and copper tubing to heat the transmission liquid being circulated through each panel. In accordance with the invention, a relatively small diameter copper tubing is employed and a plurality of parallel sections is preferred so that the amount of heat absorbed by the liquid is increased. The panel is, as has been noted above, formed by sandwiching the tube between two sections of copper screening embedded in a concrete slab. For smaller panels, one section of copper screening can be laced between the tubes because the size does not require as much thermal reinforcement.

The concrete panel of the invention preferably has a roughened surface which will reduce reflection and increase the absorbent surface available. Heat is transferred into the circulating fluid through the entire circumference of all the tubing embedded in the concrete slab by reason of the encasement of these tubes in the concrete slab.

Figure 4:
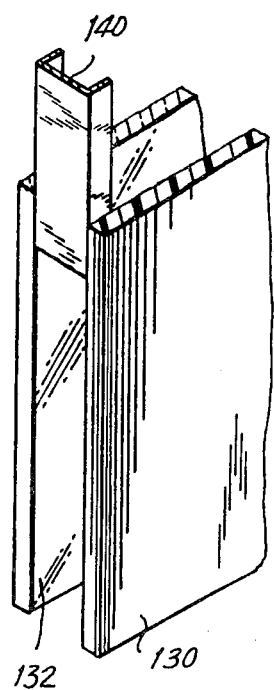
FIG. 4 illustrates a shield arrangement for the solar panel arrangement of FIGS. 2 and 3 and for other solar panel arrangements of the invention.

FIG. 4 illustrates in perspective and partially diagrammatic view the technique by which the shields 130 and 132 may be mounted in spaced relation on one side of the concrete slab. Thus, for example, shields 130 and 132 may be fused, bonded or sealed to the outer flanges of a U-shaped channel 140 made for example of aluminum or the like. The shields 130 and 132 may, as noted in part above, be fabricated of glass or of a transparent or translucent plastic capable of admitting solar heat therethrough to the concrete slab.

As noted above, the concrete slab will be preferably provided with a roughened surface. The roughened surface may be provided by roughly grooving or stroking the surface prior to the setting of the concrete. The concrete itself may be standard and, for example, there may be employed the conventional ratio of two parts of sand and gravel to one part of concrete.

Panels of the above-noted type may be, for example, 5½ feet high and 30 inches wide. The panels will weigh approximately seventy to ninety pounds and the pump employed in association therewith may be, for example, a ¼ horsepower pump capable of pumping 15 gallons per minute through a 38 foot rise thereby providing a throughflow in a panel of the invention of approximately three to 4½ gallons per minute per panel. Larger or smaller pumps can be employed when necessary.

Figure 5:
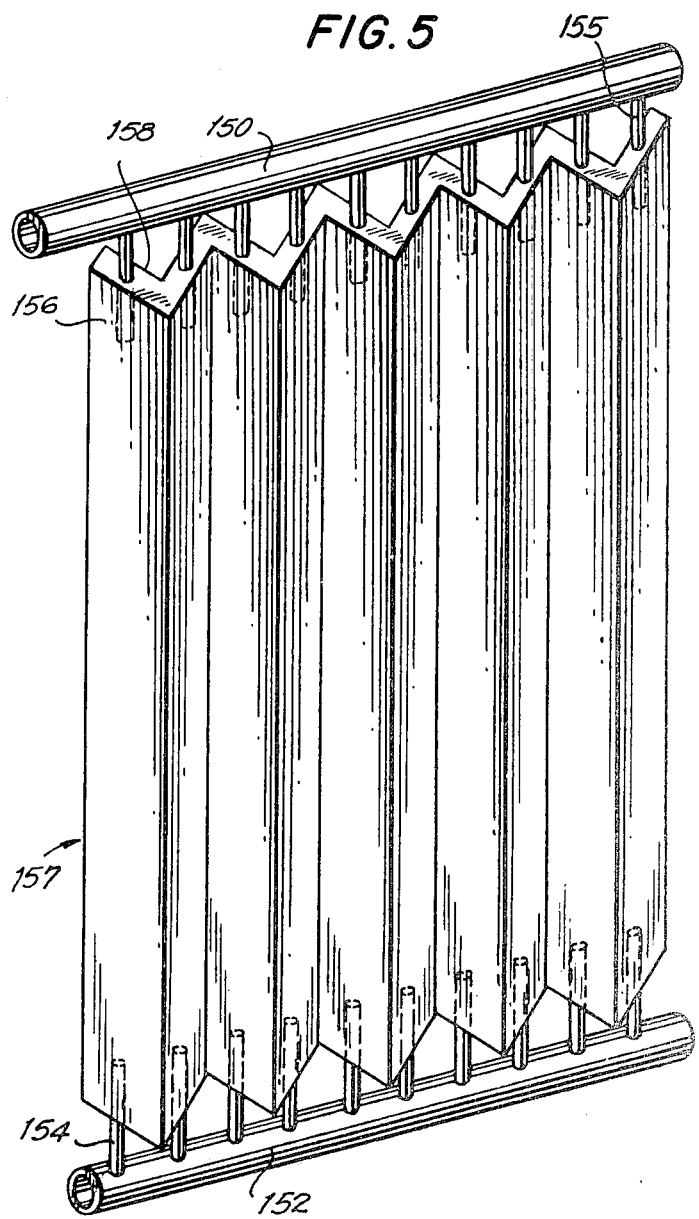
FIG. 5 is a perspective view of a further solar panel in accordance with another embodiment of the invention.

FIG. 5 illustrates a further panel of the invention which is a panel that does not necessarily employ a concrete. In FIG. 5 appears a header tube 150, a return tube 152 and a plurality of tubes 154 and 155 connected respectively thereto. These tubes 154 are connected or attached to a hollow envelope 157 constituted by corrugated steel sheets 156 and 158 or the like capable of absorbing heat from the sun and transferring heat to fluid passing through the envelope and transferring heat to fluid passing through the envelope.

Figure 6:
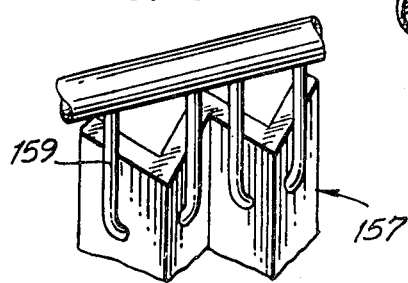
FIG. 6 is a modification of the panel of FIG. 5.

In the aforesaid arrangement, while the preferred material for the corrugated sheets 156 and 158 has been indicated as being steel. Alternatively, copper may be employed. In this arrangement all of the tubing (i.e., the header, riser and return tubing) is preferably of steel or copper with the header and return tubing being substantially larger than the riser tubing as concerns diameter. The arrangement in FIG. 5 can be modified so that envelope 157 is constituted by a plurality of separate parallel flattened tubular sections. FIG. 6 illustrates that header and return tubes can be connected to envelope 157 by risers 159 coming in through one of the faces of the envelope.

In the arrangements of FIGS. 5 and 6, the steel or copper constituting the corrugated sheets is preferably provided with a black dull finish administered by painting the same. This combination provides an efficient heat absorber. In addition, the corrugation of the panels serve as a directional surface because of the angles, valleys and peaks provided by the corrugation. The panel is designed to supply a more direct exposure to the sun because of the angular corrugations.

Tests conducted with the panel of FIG. 2 indicate a recovery of 160 B.T.U.'s (net ambient temperature of 0° F. with 15 M.P.H. wind) and higher per square foot per hour, this being substantially greater than the amount of heat recovered in other solar panel systems currently available. In fact, the amount of heat recovered per square foot per unit time represents a substantial advance in the art.

Regarding the corrugated envelope referred to hereinabove, it is possible, for example, to employ 0.018-26 gauge, #304 type 1818 stainless steel. The gauge can be changed depending on structural requirements and it is mentioned herein only by way of suggestion and not by way of limitation relative to the invention.

By way of example, ¼ inch outside diameter copper tubing can be employed within block 116 in the embodiment illustrated in FIG. 2. The size of header 100 and return tube 102 can vary widely and, for example, ¾ or one inch inside diameter tubing has been employed. All of these dimensions are suggestive only and are not limiting of the invention.

The corrugated panel illustrated in FIG. 5 may be enclosed in a housing which is covered with either single or double glass arrangement as illustrated in FIGS. 3 and 4 to act as a heat trap. The corrugated panel can also be used with or without an enclosure if the panel is coated with a clear plastic skin which may be fused to the surface of the metal. Such skin would also act as a heat trap. By way of example, there may be employed clear high temperature acrylic or Teflon which can be sprayed over the blackened surface of the corrugated panel to reduce convection and radiation heat losses.

Especially good results have been obtained with a solar heating panel comprising a hollow envelope such as indicated at 157 in FIG. 5, having two faces formed with a plurality of parallel ridges and valleys which are in turn parallel with the path of water through the envelope between tubes 150 and 152. The envelope is provided with at least one coating of a clear plastic on a primer coating of heat absorbent material which is applied to the outer surface of the envelope. The primer coating is preferably a black deoxidant and the plastic is preferably Teflon applied in at least one layer of an order of magnitude of thickness of about 0.0005-0.0015 inches. In the preferred embodiment up to three additional layers of Teflon may be applied to the first said layer. The Teflon is advantageously provided with a flat or semi-gloss finish. If the Teflon is 0.0005 inches thick, and in one layer, the total combined thickness will be 0.00175 inches.

The envelope may be formed with a single interior chamber for the passage of the heat conducting fluid or may be formed with a plurality of parallel cells. The envelope may be accommodated in a box-like structure in the manner indicated generally in FIG. 3 and may be provided with one or more panes of glass or transparent plastic spaced from each other and from the envelope and thereby shielding the envelope in addition to that shielding provided by the Teflon and primer coating.

The method of the invention involves making a solar panel forming an envelope with two metal corrugated faces such as indicated in FIG. 5, coating at least one of the faces with a light or heat absorbing deoxidant, spraying plastic on the thusly coated faces or otherwise applying the plastic onto the thusly coated faces, and baking the plastic. The plastic is as noted above preferably Teflon which is coated on to a thickness of about 0.0005-0.0015 inches and is baked on at about 700° F. The plastic may be coated on in up to four layers, each of which is separately baked on and is of a thickness of the first said layer, namely, in the order of magnitude of about 0.0005-0.0015 inches.

In FIG. 7 appears an envelope 170 extending between inlet tube 172 and outlet tube 174. Inlet tube 172 is provided with fitting 176 whereas tube 174 is provided with fitting 178. Fitting 178 additionally appears in FIG. 8.

In this embodiment of the invention no tubes are required for connecting the envelope to the supply and outlet tubes. The envelope extends into the inlet and outlet tubes by means of slots such as the slot 180 provided for purposes of accommodating and supporting the envelope.

As will be noted from the configuration of the slot 180, the envelope is formed of a plurality of V-shaped tubes consisting of flattened tubing having the cross-section of a V. Water thus passes from the tube 172 to the tube 174 via a path which is parallel to the valleys and ridges formed by the individual flattened tubes which are parallel to each other and to the path of the water.

In FIG. 8 it is seen that the tubes extend part way into the inlet tubing, the bottom 182 of one of the flattened tubes being visible in FIG. 8.

FIG. 9 illustrates the utilization of a plurality of flattened tubes 190, 192 and so forth joined in an end-to-end relationship in such a manner as to define a plurality of valleys and ridges. In this embodiment as in FIG. 8, a corrugated envelope is simulated. In the embodiment of FIG. 9 are illustrated panes 194 and 196 of transparent glass or plastic. These panes are spaced from each other by a space 198 and are furthermore spaced from the envelope constituted by flattened tubing 190 and 192. The rear of the enclosure is formed by an opaque sheet 200 which is part of a box-like enclosure which supports the panes 194 and 196 such as, for example, by the type of bracket illustrated in FIG. 4.

The embodiment illustrated in FIG. 7 and in FIG. 9 may utilize the type of plastic coating referred to hereinabove. By way of further example, there may be applied directly to the metal constituting the envelope material three coatings such as, for example, a coating of 0.0003 inches of prime coating, a layer of 0.001 inches of black deoxidant coating and a layer of 0.00045 inches of clear top coating of flat or semi-gloss finish and preferably of Teflon. Up to three additional similar coatings of Teflon may be superposed over the first coating of Teflon.

As has been stated above, it will now appear that the invention provides a solar heating panel comprising a hollow envelope having a plurality of ridges and valleys parallel to the path of the fluid passing therethrough. The envelope is of a heat conductive metal and a primer coating of heat absorbent material is provided on the envelope with at least one coating of clear plastic being superposed on the primer coating. The primer coating may have superposed thereon a coating of black material interposed between the primer coating and the clear plastic. On the other hand the primer coating may be itself of a dark color which makes it heat and light absorbent.

A more specific example of the procedure by which envelopes may be coated for solar panels in accordance with the invention is as follows: an envelope is put into an oven at 700° F. for one hour to burn off oil, fingerprints and other organic contamination or the like. The envelope is then cooled and is abrasive blasted with 80 mesh aluminum oxide to clean the surfaces thereof. A light metal surface is obtained. Primer is applied to the thusly cleaned surface to a thickness of 0.0005 inches ± 0.00005 inches. The primer is, for example, DuPont 850-204 Green Primer which provides an adhesive coating between the substrate and a top coat, such as Teflon. The primer is baked on at a temperature of 700° F. for one hour and then cooled to ambient temperature. The thusly primed envelope is then coated with black Teflon which is, for example, DuPont DFE 851-245. This is Teflon provided with carbon black. The envelope with the second coat thereon is then baked at 700° F. and cooled thereafter to ambient temperature. A further coating of clear Teflon with a semi-gloss finish is coated on to a depth of 0.0005 inches ± 0.00005 inches and this coating may be applied to one side only. The clear Teflon may be, for example, DuPont 852-201 clear Teflon. It is not polished to provide a mirror finish but remains with a semi-gloss finish which is preferred in accordance with the invention. The intermediate coating of TFE 851-245 is also applied to a depth of 0.0005 inches ± 0.00005 inches. The final coating of clear Teflon may be baked on at 700° F. at one hour. Additionally, up to three further coatings of the same depth of clear Teflon may be added to the envelope.

There will now be obvious to those skilled in the art many modifications and variations of the structures and techniques set forth hereinabove. These modifications and variations will not depart from the scope of the invention if defined by the following claims.

What is claimed is:

1. A solar heating panel comprising a hollow envelope, said envelope being of heat conductive metal, a primer coating of heat absorbent material on said envelope, and at least one coating of clear plastic on said primer coating.

2. A solar heating panel as claimed in claim 1 comprising means to pass a heat abosrbing liquid in a determinable path through said envelope, said envelope having a plurality of ridges and valleys, said ridges and valleys being aligned in parallel with each other and with said path.

3. A solar heating panel as claimed in claim 2 wherein said plastic is Teflon in at least one layer of an order of magnitude of thickness of about 0.0005-0.0015 inches.

4. A solar heating panel as claimed in claim 3 comprising up to three additional layers of Teflon on the first said layer.

5. A solar heating panel as claimed in claim 3 wherein said Teflon has a flat or semi-gloss finish.

6. A solar heating panel as claimed in claim 4 wherein said Teflon has a flat or semi-gloss finish.

7. A solar heating panel as claimed in claim 1 wherein said envelope is provided with a single interior chamber for the passage of a heat conducting fluid.

8. A solar heating panel as claimed in claim 3 wherein said envelope is provided with a single interior chamber for the passage of a heat conducting fluid.

9. A solar heating panel as claimed in claim 1 wherein said envelope comprises a plurality of parallel cells.

10. A solar heating panel as claimed in claim 3 wherein said envelope comprises a plurality of parallel cells.

11. A solar heating panel as claimed in claim 1 comprising a box-like structure housing said envelope and including at least one radiation permeable pane shielding said envelope.

12. A solar heating panel as claimed in claim 3 comprising a box-like structure housing said envelope and including at least one radiation permeable pane shielding said envelope.

13. A solar heating panel as claimed in claim 11 comprising a plurality of radiation permeable panes including the first said pane spaced from each other and from said envelope and shielding the latter.

14. A solar heating panel as claimed in claim 12 comprising a plurality of radiation permeable panes including the first said pane spaced from each other and from said envelope and shielding the latter.

15. A solar heating panel as claimed in claim 1 wherein said primer coating is a deoxidant.

16. A solar heating panel as claimed in claim 1 wherein said envelope has two parallel faces of corresponding corrugated form.

17. A method of working a solar panel comprising forming an envelope with two metal faces, coating at least one of said faces with a light absorbing deoxidant, spraying plastic on the thusly coated faces, and baking the plastic.

18. A method as claimed in claim 17 wherein the metal faces are corrugated and the plastic is coated on to a thickness of about 0.0005–0.0015 inches and is baked on at about 700° F.

19. A method as claimed in claim 18 wherein the plastic is coated on in up to four layers each of which is separately baked on and is of a thickness of about 0.0005–0.0015 inches.

20. A method as claimed in claim 17 wherein a primer coating is applied beneath the deoxidant.

* * * * *